S. TIBBETTS.
Coal-Sifters.

No. 141,737. Patented August 12, 1873.

UNITED STATES PATENT OFFICE.

LEWIS TIBBETTS, OF AUGUSTA, MAINE, ASSIGNOR OF ONE-HALF HIS RIGHT TO JOSEPH H. CLARK, OF SAME PLACE.

IMPROVEMENT IN COAL-SIFTERS.

Specification forming part of Letters Patent No. 141,737, dated August 12, 1873; application filed May 15, 1873.

*To all whom it may concern:*

Be it known that I, LEWIS TIBBETTS, of Augusta, in the county of Kennebec and State of Maine, have invented an Improved Coal-Sifter, of which the following is a specification:

My invention relates to an improvement of that class of coal-sifters in which the sieve is mounted over a box placed on rockers, and the dust freed from the coal by means of the rocking motion imparted to the box. The improvement consists in making the sieve of such size as to fit in the box, and in providing the box with removable slats, on which the sieve is mounted when in use.

Figure 1:
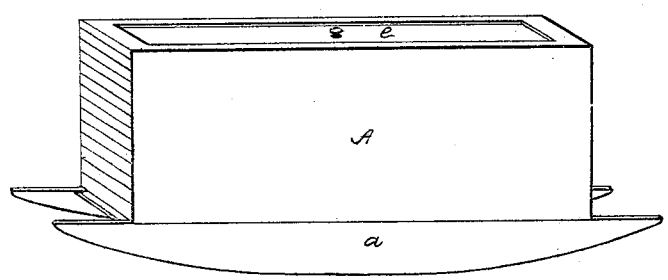
Figure 2:
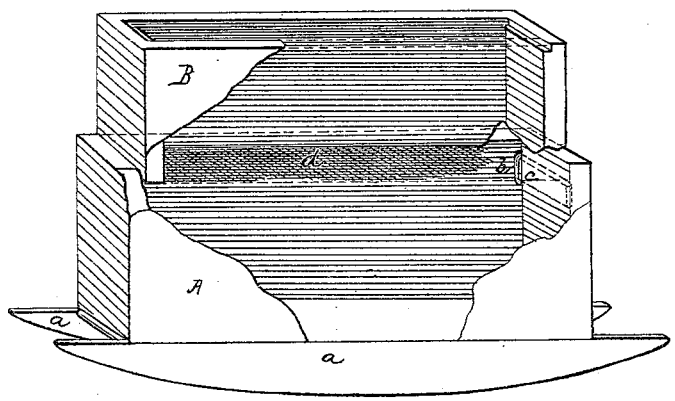
Figure 3:
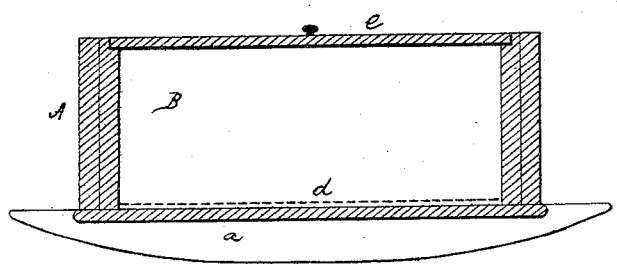

In the drawing, Figure 1 is a perspective view of the sifter when the sieve is within the box. Fig. 2 is also a perspective view with parts of the sieve and box broken away, and also showing the slats, the sieve being in position for use. Fig. 3 is a central vertical longitudinal section of the sifter.

The letter A represents a box or receptacle for the dust, &c., from which the coal is freed, mounted on rockers $a$. In the sides or ends of this box outwardly-flaring recesses $b$ are made for the purpose of receiving the beveled ends of slats $c$. These slats are made of tough elastic wood, and are "sprung" in and out of the recesses $b$. B is the sieve, composed of a frame of corresponding shape with the box, and of such size as to fit easily within the same, said frame being provided with a bottom of wire-netting, $d$, and a lid, $e$. This sieve, when in position for use, Fig. 2, rests upon the slats $c$, and, a rocking motion being imparted to the box, the contents of the sieve are agitated, and the dust, &c., separated from the coal. When the sifter is not in use the sieve is removed, the slats sprung out of place and put in the box, and the sieve then also placed therein, as shown in Figs. 1 and 3.

Thus is formed a neat, substantial, and cheap sifter; one that is effective in use, is easily put together, and as easily packed up.

Having thus described my invention, what I claim as new, and desire to secure by Letters Patent, is—

The coal-sifter herein shown and described, composed of an ash-box, A, mounted on rockers $a\ a$, and provided with removable slats $c\ c$, sprung into angular recesses $b$ near the top of the box, and having a removable sieve, B, made of such size as to be placed within the box A when not in use by removing the slats $c\ c$, so that the sifter shall occupy less space, as specified.

To the above specification of my invention I have signed my name this 13th day of May, A. D. 1873.

LEWIS TIBBETTS.

Witnesses:
E. W. WHITEHOUSE,
DANIEL WHITEHOUSE.